W. S. McLEAN.
RAILROAD TRUCK AND CAR WHEEL.
No. 11,438. Patented Aug. 1, 1854.
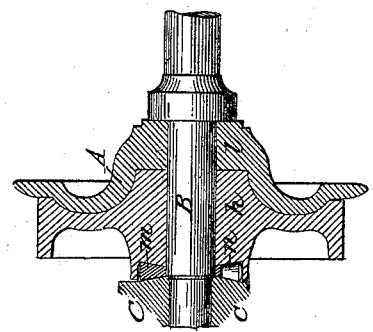
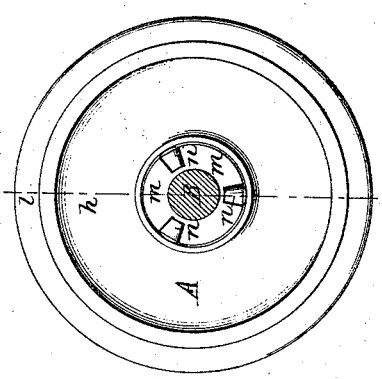
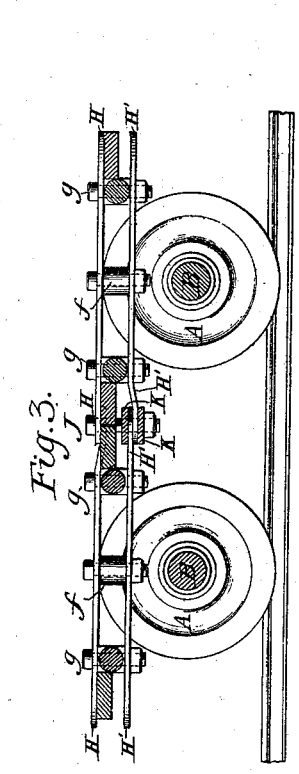
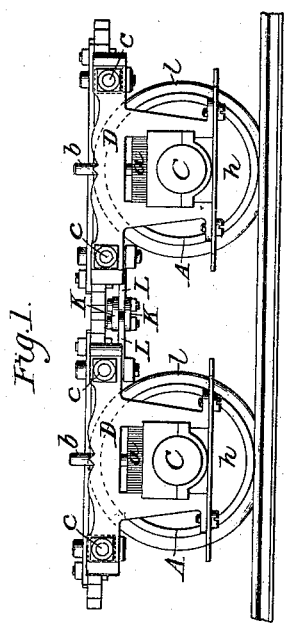
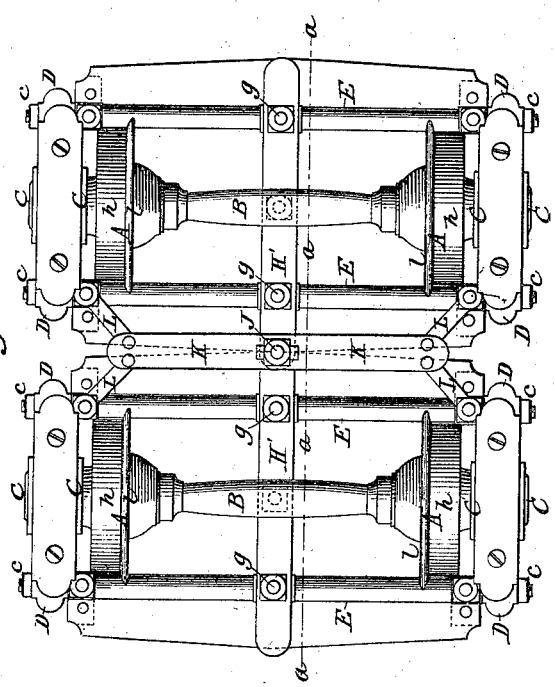

UNITED STATES PATENT OFFICE.

WM. S. McLEAN, OF PITTSBURGH, PENNSYLVANIA.

CAR-WHEEL WITH INDEPENDENT FLANGE AND TREAD.

Specification of Letters Patent No. 11,438, dated August 1, 1854.

*To all whom it may concern:*

Be it known that I, WILLIAM S. MCLEAN, of the city of Pittsburgh, county of Allegheny, State of Pennsylvania, have invented a new and useful Improvement in Railroad-Car Wheels; and I do hereby declare that the following is a full and exact description thereof, reference being had to the annexed drawings, making part of this specification, of which—

Figure 1 is a face view of the wheel, Fig. 2, a transverse section, and Figs. 3 and 4 details of parts connected with the wheel.

In all the figures, the same letters of reference indicate like parts.

A is the wheel, which is composed of two parts *h* and *i*. At the center of each wheel is formed a large and substantial hub through which the axle, B, passes. By means of this hub each part of the wheel can be securely attached to the axle; also the end of the hub to the flange wheel is dished, so as to pass over the end of the hub of the tread wheel to the depth of three inches. I also on the face of this wheel provide outside of the said dished part a curved projection having its outer portion near the flange bent back in a reversed direction from the said dished part, and fitted into corresponding circular recessed face of the tread wheel, so that the two portions shall mutually enter into and support each other. By constructing this wheel in the manner described it can be made of cast iron secure, without connecting wrought iron therewith. This wheel is composed of two pieces only, the flange wheel and the tread wheel. Each piece is a solid piece, the one let into the other substantally, which forms a secure car wheel. By this means I avoid the expense and danger of attaching a loose flange to car wheels in the manner described by Jones; that is to say, a sliding flange connected to the wheel by arms and bolts. The part *h h* is provided with a set of antifriction rollers *n n*, in the shape of frustums of cones, which conic rollers are placed between the wheel and the base C of the truck. The rollers *n n* are kept in place and conducted by a ring *m m*, (shown by Fig. 3 in perspective view and by Fig. 4 in vertical transverse section,) which for this purpose openings are cut in the ring to secure the cone rollers. The thickness of the ring *m* must be less than the smallest diameter of the cone roller; otherwise it would operate merely as a washer. The arrangement of an antifriction set between the wheel and box is much required when the wheel turns loose on its shaft, as it may do in this case, but any other construction of an antifriction set may answer the same purpose, or to reduce the friction between wheel and box.

I do not claim the separate and independent flange and tread, as that has been patented or described by James Jones, William Howard, and others; but What I do claim as my invention and desire to secure by Letters Patent, is—

The above described car wheel with the flange and tread capable of separate action, when they are made to interlock and mutually support each other, so as to prevent any strain tending to separate them from being thrown entirely upon the journal; the whole being constructed and arranged substantially as above described.

WM. S. McLEAN.

Witnesses:
JAMES THOMPSON,
I. N. THOMPSON.